United States Patent [19]
Kubotani et al.

[11] Patent Number: 5,651,796
[45] Date of Patent: Jul. 29, 1997

[54] METHOD FOR PRODUCING LOW BULK DENSITY HOLLOW FINE POWDER OF ALKALI METAL COMPOUND

[75] Inventors: Atsuyoshi Kubotani; Osamu Ishibashi; Koichi Ono, all of Amagasaki, Japan

[73] Assignee: Osaka Fuji Kogyo Kabushiki Kaisha, Hyogo Pref., Japan

[21] Appl. No.: 510,339

[22] Filed: Aug. 2, 1995

[30]   Foreign Application Priority Data

Aug. 3, 1994   [JP]   Japan .................................. 6-200318

[51] Int. Cl.$^6$ ............................. C01D 3/04; C01D 3/22
[52] U.S. Cl. ........................ 23/302 R; 23/303; 159/48.1; 159/4.02; 261/143; 423/477.4
[58] Field of Search ..................... 23/303, 302 R; 261/143, 118; 431/1; 159/48.1, 4.02; 423/499.4

[56]   References Cited

U.S. PATENT DOCUMENTS

| Re. 19,556 | 4/1935 | Lamont | 159/48.1 |
|---|---|---|---|
| 2,887,390 | 5/1959 | Coulter et al. | 159/48.1 |
| 3,148,023 | 9/1964 | Ploss | 23/303 |
| 5,136,793 | 8/1992 | Kubotani | 431/1 |
| 5,205,728 | 4/1993 | Mansour | 431/1 |

*Primary Examiner*—Ngoc-Yen Nguyen
*Attorney, Agent, or Firm*—Cushman Darby & Cushman IP Group of Pillsbury Madison & Sutro LLP

[57]   ABSTRACT

A low bulk density hollow fine powder of alkali metal compound can be produced from an aqueous solution of the compound by one step. The method for producing a low bulk density hollow fine powder of alkali metal compound according to the present invention comprises a step of contacting an aqueous solution of an alkali metal compound with a pulsating combustion gas.

2 Claims, 1 Drawing Sheet

METHOD FOR PRODUCING LOW BULK DENSITY HOLLOW FINE POWDER OF ALKALI METAL COMPOUND

BACKGROUND OF THE INVENTION

1. Field of the invention

The present invention relates to a method for producing a low bulk density hollow fine powder of alkali metal compound. For example, a low bulk density hollow fine powder of sodium chloride or table salt has expectations as a unique seasoning due to its scarce irritation and improved taste. Special usages are foreseen for low bulk density hollow fine powders of other alkali metal compounds because of their exhibiting peculiar phenomenon in the solubility, reactivity, etc. in comparison with those of coarse powders.

2. Description of the Prior Art

Conventionally, the spray drying method has being employed for producing low bulk density powders. Since the particle size of powder obtained by the method is controlled by the size of fluid sprayed, it has been hard to produce fine powders of micron order size. Mechanical grinding of the spray-dried powder may enable to produce a fine powder, however, the additional one step increases the production cost.

SUMMARY OF THE INVENTION

It is an object of the present invention to provide a method for producing by one step a low bulk density hollow fine powder of alkali metal compound from an aqueous solution of the compound.

The method for producing a low bulk density hollow fine powder of alkali metal compound according to the present invention comprises a step of contacting an aqueous solution of an alkali metal compound with a pulsating combustion gas.

DESCRIPTION OF THE PREFERRED EMBODIMENTS

Alkali metal compounds usable for the present invention are exemplified by sodium chloride (table salt), potassium chloride, sodium sulfate (salt cake), potassium sulfate, sodium hydroxide (caustic soda), potassium hydroxide (caustic potash), etc.

A pulsating combustion gas is a hot combustion gas generated by a so-called pulse combustor and the gas is pulsating generally at the rate of 50–700 cycles per second. When a humidified material is introduced into the atmosphere of the pulsating combustion gas, the material is subjected to not only the drying effect by the hot combustion gas but also to physical impulse actions (sonic power and pressure, etc.) by the rapidly pulsating gas, and the humidified material turns instantly to useful products or dehydrated wastes without scorching nor chemical changes in ingredients. Thus, dryers for dehydrating humidified materials by use of pulse combustors as the source of hot gas are calling attention. The present inventors have found out as the result of studying on capabilities of the pulsating combustion gas that a low bulk density hollow fine powder of alkali metal compound is obtainable by contacting an aqueous solution of the alkali metal compound with a pulsating combustion gas.

Figure 1:
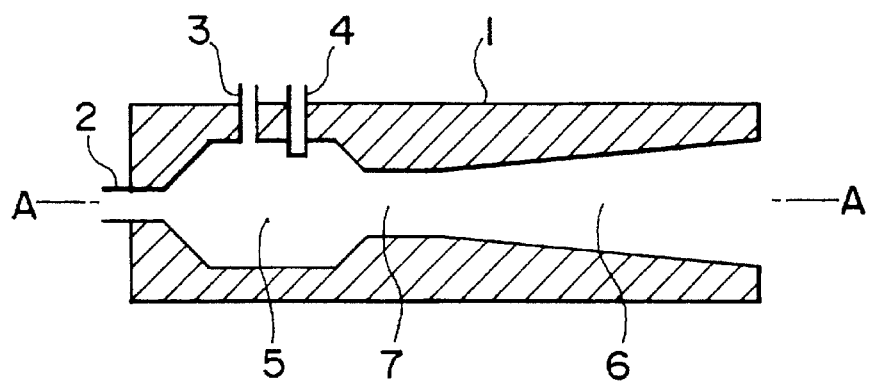
FIG. 1 is a cross-sectional view showing constituents of a pulse combustor used for the invention.

Pulse combustors are developed based on the jet engine technology, and numerous types of pulse combustors are developed for drying humidified materials. An example of the pulse combustors is disclosed in Japanese Patent Publication No. 6-33939 as will be explained hereunder. In FIG. 1, the pulse combustor 1 has sequentially on the same axis A—A a combustion chamber 5 equipped with at least one air charging pipe 2, at least one fuel charging pipe 3 and at least one igniting means 4, and a combustion gas exhaust pipe 6 shaped to have a gradually enlarging outlet, and the combustion chamber 5 is connected with the combustion gas exhaust pipe 6 by means of a constricted portion 7. For the igniting means 4, an electric igniter (ignition plug) or a pilot flame can be used. In the present invention, pulsating combustion gases generated not only by this type of pulse combustors but also by pulse combustors of different types are employable similarly.

At the start-up of the pulse combustor, the combustion chamber 5 is firstly filled with air from the air charging pipe 2 and mist of fuel like diesel oil is sprayed from the fuel charging pipe 3. Under the condition, spark generated by the electric igniter 4 causes an explosive combustion of the fuel to drive out the hot combustion gas to the exhaust pipe 6. During the combustion, the charging of air and fuel to the combustion chamber is interrupted temporarily due to a momentary high pressure in the combustion chamber 5, but the charging resumes due to a reduced pressure in the combustion chamber 5 caused by driving out of the combustion gas to the exhaust pipe 6, and the explosive combustion by ignition and formation of hot gas are repeated. As the result of these intermittent explosions, pulsating hot gas and sound are generated. A humidified material charged into or at the outlet of the exhaust pipe 6 is subjected to not only drying thereof by the hot combustion gas but also to physical impulse actions (sonic power and pressure etc.) by the rapidly pulsating gas to turn instantly into a dehydrated material. In course of time, the pulse combustor thus started becomes to proceed the intermittent explosive combustion of the air and fuel charged without being ignited by the electric igniter, thanks to the automatic ignition by contact with the heated inside wall of the combustion chamber 5 as similarly as the working principle of hot-bulb engines. Under the state, the electrical ignition by the igniter can be turned-off without interrupting the continued operation.

Figure 2:
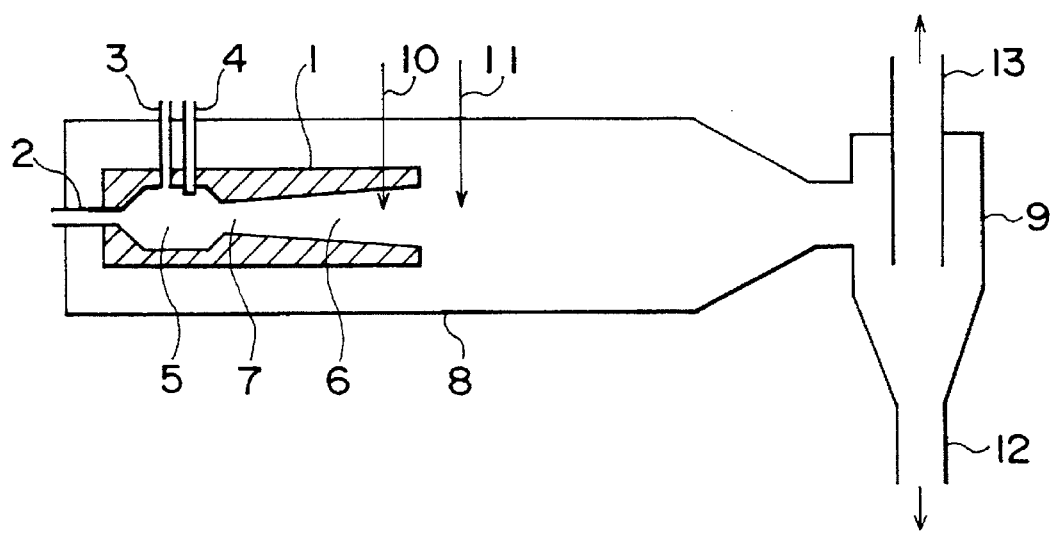
FIG. 2 is a cross-sectional view showing constituents of a pulse dryer equipped with the pulse combustor shown in FIG. 1.

FIG. 2 shows a cross-sectional view indicating exemplified constituents of a puls dryer equipped internally with the pulse combustor shown by FIG. 1, in which the pulse combustor 1 is disposed at one end of the body of a cylindrical dryer 8 and the other end of the body is connected with a cyclone-type dried powder collector 9. An aqueous solution of an alkali metal compound is charged from a charging outlet of raw material solution 10 disposed inside of the combustion gas exhaust pipe 6 or from a charging outlet of raw material solution 11 disposed at a place outside of the outlet of the combustion gas exhaust pipe 6. The charged aqueous solution is dehydrated instantly, and alkali metal compound particles having a bulk density of 0.2–0.3 g/ml and a particle size of 10–40 μm are separated from the combustion gas by the cyclone-type dried powder collector 9 and discharged from the discharging outlet of dried powder 12. The combustion gas separated from the dried powder is exhausted from the discharging outlet of separated gas 13.

The aqueous solution of alkali metal compound is preferably charged at places where the temperature of the combustion gas is 300°–600° C. The aqueous solution of alkali metal compound is charged from the charging outlet 10 or 11 as an aqueous solution, but may be charged using a duplex tube in which one tube being the charging outlet of the aqueous solution and the other being a supplier of compressed air, thereby controlling the particle size of powder is feasible by adjusting diameters of the tubes, pressure of compressed air, drying temperature, etc.

EXAMPLE 1

By use of a pulse dryer having basic constituents shown in FIG. 2, a 20 weight % aqueous solution of commercial table salt was charged from the charging outlet of raw material aqueous solution 11 to contact with a pulsating combustion gas (pulse cycle: 500–600/second) of 300° C. Low bulk density fine powder table salt having a particle size of 10–40 μm and a bulk density of 0.23 g/ml was obtained from the raw material table salt having a particle size of 0.3–0.7 mm and a bulk density of 0.76 g/ml (density of sodium chloride is 2.164). According to microscopic observations, the obtained low bulk density fine powder table salt was a hollow powder having a face powder-like touch and improved taste of scarce irritation, which gave it expectations as a unique seasoning.

The invention enables to prepare in one step a low bulk density hollow fine powder of alkali metal compound from an aqueous solution of the compound.

What is claimed is:

1. A method for producing a low bulk density hollow fine powder of alkali metal compound, wherein said method comprises a step of contacting an aqueous solution of an alkali metal compound with a pulsating combustion gas, wherein said powder of alkali metal compound has a bulk density of 0.2–0.3 g/ml and a particle size of 10–40 μm.

2. A method for producing a low bulk density hollow fine powder of alkali metal compound according to claim 1, wherein said pulsating combustion gas being generated by burning fuel in a combustion chamber of a pulse combustor, said pulse combustor having sequentially on the same axis the combustion chamber equipped with at least one air charging pipe, at least one fuel charging pipe, at least one igniting means, and a combustion gas exhaust pipe shaped to have a gradually enlarging outlet, and said combustion chamber being connected with said combustion gas exhaust pipe by means of a constricted portion.

* * * * *